United States Patent [19]
Majumdar

[11] 3,852,082
[45] Dec. 3, 1974

[54] FIBRE REINFORCED CEMENT
[75] Inventor: Amalendu Jyoti Majumdar, St. Albans, England
[73] Assignee: National Research Development Corporation, London, England
[22] Filed: July 26, 1972
[21] Appl. No.: 275,421

Related U.S. Application Data
[63] Continuation-in-part of Ser. No. 127,361, March 23, 1971, Pat. No. 3,783,092.

[30] Foreign Application Priority Data
Aug. 5, 1971   Great Britain .................... 36856/71

[52] U.S. Cl. .................................................. 106/99
[51] Int. Cl. ............................................... C04b 7/12
[58] Field of Search ......................... 106/99, DIG. 1

[56] References Cited
UNITED STATES PATENTS

| | | | |
|---|---|---|---|
| 2,446,990 | 10/1948 | Schuetz................................ | 106/99 |
| 2,738,285 | 3/1956 | Biefeld................................. | 106/99 |
| 3,704,147 | 11/1972 | Hardy et al. ......................... | 106/57 |
| 3,736,162 | 5/1973 | Chvalovsky et al................... | 106/99 |

FOREIGN PATENTS OR APPLICATIONS

| | | | |
|---|---|---|---|
| 390,123 | 6/1931 | Great Britain ........................ | 106/99 |
| 467,159 | 8/1950 | Canada ................................. | 106/99 |

*Primary Examiner*—Delbert E. Gantz
*Assistant Examiner*—James W. Hellwege
*Attorney, Agent, or Firm*—Flynn & Frishauf

[57] ABSTRACT

A fibre-reinforced cement product comprises a cement matrix containing at least 10% by weight of a pozzolana and alkali-resistant glass fibres containing zirconia.

17 Claims, No Drawings

FIBRE REINFORCED CEMENT

This application is a continuation-in-part of application Ser. No. 127361 filed Mar. 23, 1971 now U.S. Pat. No. 3,783,092. This invention relates to glass fibre-reinforced cementitious products and is an improvement or modification of the inventions described in U.K. Pat. Nos. 1200732 and 1243972.

Recent developments in the field of glass reinforced cement composites have resulted in the establishment of criteria for the compatibility of glass fibres with cementitious materials such as Portland cement and other types of cement in which the setting and hardening of the material depend on a reaction between calcareous and siliceous materials. These criteria including alkali-resistance have been described in our U.K. Pat. Nos. 1200732 and 1243972.

It has now been found, in accordance with this invention, that among the possible cements and glass fibres that may be used to give satisfactory composite materials an outstanding degree of water durability results from the combination of pozzolanic cements and glass fibres derived from glasses containing zirconia.

Pozzolanic cements are those containing a proportion of "pozzolana" which term is to be understood for the purposes of this application in the sense used by standard authors including especially R. H. Bogue "The Chemistry of Portland Cement" (Rheinhold Publishing Corporation 2nd Edition, 1955) and F. M. Lea "The Chemistry of Cement and Concrete" (Edward Arnold, 3rd Edition, 1970). Thus the term "pozzolana" although originally coined to signify a natural material of volcanic origin is now used to embrace artificial as well as natural materials which are silicate glassy materials capable of reacting with calcium hydroxide and thereby setting into a hard strong material. For example, material known as "pulverised fuel ash," a waste product which presents a disposal problem, has been found to be an excellent pozzolana for the purposes of this invention. The natural pozzolanas are abundant in various countries, e.g. Italy, whereas among artificial pozzolanas certain glasses e.g. soda/lime/silica glasses may be mentioned.

Composite products of improved water durability have been obtained by the reinforcement of Portland cement containing at least 10 percent pozzolana by weight, e.g., from about 15 to about 50% or more, desirably at least 25% and preferably 35 to 45% e.g. 40% pulverised fuel ash or other pozzolana with fibres of glasses containing at least 6.0 mol % $ZrO_2$ preferably at least 9 mol % $ZrO_2$ including glasses based on the system $SiO_2/ZrO_2/Na_2O$, for example those described in U.K. application No. 1243972 and U.K. application No. 37862/69.

Composite materials in accordance with this application may be produced by the techniques described in the above mentioned prior specifications and shaped as pipes, boards, sheets and other structures. Usually from 0.5 to 10% by weight of glass fibre may be employed.

Excellent results are obtained with 4 to 6% glass. In addition it has been found that a very desirable increase in the strength of the composites may be obtained by controlled heat treatment. This is a particularly important feature because of the necessity to achieve a suitable level of strength for the handling of the composite material at an early stage in manufacture and before the cement fibre bond has been well established. Furthermore, the heat treatment accelerates the attainment of stable properties and ultimate strength. In the case of cement boards prepared by the spray suction technique, a period of some days heating, e.g., 2 or 3 days under water at a temperature of at least 60°C, e.g., 60° to 80°C commenced at a time not less than about 5 hours after the casting of the board, gives rise to an acceptable bending strength, e.g., 2,500 psi. If more time is allowed to lapse after casting before heating is commenced, say 1 day or even up to 7 days, the strength of the matrix produced by the heating cycle is increased further. Higher temperatures may of course be employed, e.g., 80° to 90°C, but if a temperature approaching 100° too closely is used an undesirable level of attack on the glass fibre will result.

Typical results obtained with zirconia glasses reinforced matrices of ordinary Portland cement (OPC) and ordinary portland cement containing pulverised fuel ash (PFA), an Italian pozzolana or ground "A" glass (soda/lime/silica) are shown in the following Tables.

Table I gives the composition of the glass and quantities used:

TABLE I

| Code No. of Board | Glass Composition * | Matrix | Glass Content % by wt |
|---|---|---|---|
| 1 | A | OPC | 5.06 |
| 2 | A | OPC + 40% PFA | 5.46 |
| 3 | B | OPC | 4.94 |
| 4 | B | OPC + 40% PFA | 5.17 |
| 5 | C | OPC | 4.91 |
| 6 | C | OPC + 40% PFA | 5.12 |
| 7 | A | OPC + 15% PFA | 4.60 |
| 8 | A | OPC + 25% PFA | 5.03 |
| 9 | A | OPC + 40% Pozzolana | 5.17 |
| 10 | A | OPC | 5.49 |
| 11 | A | OPC + 40% PFA | 5.34 |
| 12 | B | OPC | 5.09 |
| 13 | B | OPC + 40% PFA | 5.62 |
| 14 | A | OPC 10% "A" glass powder | 5.21 |

* Glass A (weight %): $SiO_2$ 71.0, $Al_2O_3$ 1.0, $ZrO_2$ 16.0, $Na_2O$ 11.0, $Li_2O$ 1.0.
Glass B (weight %): $SiO_2$ 60.0, $ZrO_2$ 17.6, $Na_2O$ 16.4, CaO 5.0, $Al_2O_3$ 0.6, $TiO_2$ 0.1, $Fe_2O_3$ 0.07, MgO 0.1, $K_2O$ 0.1.
Glass C (weight %): $SiO_2$ 61.4, $ZrO_2$ 18.5, $Na_2O$ 15.9, CaO 4.2.

Table II shows modulus of rupture and impact strength figures obtained after specified period of storage under water at 18°C.

TABLE II

| | Code No. of Board | DAYS | | | | |
|---|---|---|---|---|---|---|
| | | 7 days | 28 days | 1 yr. | 2 yrs. | 3 yrs. |
| Modulus of Rupture (lbs/sq.in.) | 1 | 5830 | 6263 | 3593 | 3410 | 3400 |
| | 2 | 3268 | 3984 | 4566 | 4974 | 4865 |

TABLE II—Continued

|  | Code No. of Board | DAYS | | | | |
|---|---|---|---|---|---|---|
|  |  | 7 days | 28 days | 1 yr. | 2 yrs. | 3 yrs. |
|  | 3 | 3549 | 3836 | 2975 | 2650 | — |
|  | 4 | 2317 | 2486 | 2666 | — | — |
|  | 5 | 3696 | 3806 | 2500 | — | — |
|  | 6 | 2326 | 2512 | 3178 | — | — |
|  | 7 | 4572 | 4553 | 3257 | — | — |
|  | 8 | 4189 | 4135 | 3496 | — | — |
|  | 9 | 3970 | 5075 | 4990 | 4747 | — |
|  | 14 | 4630 | 5775 | 3620 | 4100 | 3970 |
| Impact Strength (inch lbs./sq. in) | 1 | — | 127 | 58 | 41 | 39 |
|  | 2 | — | 89 | 111 | 79 | 83 |
|  | 3 | 101 | 113 | 38 | 38 | — |
|  | 4 | 74.5 | 63.5 | 71 | — | — |
|  | 5 | 82 | 74 | 41 | — | — |
|  | 6 | 80 | 62 | 68 | — | — |
|  | 7 | 125 | 128 | 73 | — | — |
|  | 8 | 116 | 105 | 80 | — | — |
|  | 9 | 86 | 117 | 68 | 65 | — |
|  | 14 | — | 112 | 49 | 46 | 56 |

Table III provides corresponding results after water treatment at 60°C.

Table V indicates the effect of the heat treatment referred to above. The composites are OPC + 40% PFA

TABLE III

|  | Code No. of Board | DAYS | | | | | | | | | |
|---|---|---|---|---|---|---|---|---|---|---|---|
|  |  | 7 | 10 | 15 | 20 | 25 | 30 | 35 | 40 | 50 | 60 |
| Modulus of Rupture | 5 | 3696 | 3470 | 2770 | 2437 | 2363 | 2265 | 2083 | — | 1877 | — |
|  | 6 | 2326 | 2930 | 3136 | 2833 | 2916 | — | 2530 | 2516 | 2434 | — |
|  | 7 | 4572 | 4113 | 3022 | — | — | — | 1750 | 1479 | — | — |
|  | 8 | 4190 | 3547 | 3343 | 2956 | 2674 | 2386 | 1922 | 1839 | — | — |
|  | 10 | 4472 | 4732 | 3272 | 2850 | — | — | 1860 | — | — | 1515 |
|  | 11 | 2931 | 4370 | 4300 | 4004 | 3640 | 3535 | 3258 | — | 3112 | — |
|  | 12 | 3947 | 3695 | 2980 | 2556 | 2354 | 2255 | 2144 | — | 1684 | — |
|  | 13 | 2665 | 2868 | 2920 | 2822 | 2465 | 2450 | 2494 | — | 2320 | — |
| Impact Strength | 5 | 82 | 67 | 48.5 | 35 | 24 | 20 | 16 | — | 13 | — |
|  | 6 | 80 | 61 | 64 | 47.5 | 42 | — | 31 | 31 | 25.4 | — |
|  | 7 | 125 | 100 | 44 | — | — | — | 15 | 7.7 | — | — |
|  | 8 | 116 | 88 | 62.5 | 46.6 | 25.0 | 17.9 | 12.0 | 12.1 | — | — |
|  | 10 | 111.7 | 84 | 27 | 13.5 | — | — | 8.7 | — | — | 8.5 |
|  | 11 | — | 90 | 70 | 65.5 | 49 | 41 | 37 | — | 25.6 | — |
|  | 12 | 82 | 59 | 40 | 27 | 25 | 18 | 14 | — | 9 | — |
|  | 13 | 69 | 56 | 53 | 33 | 33 | 28 | 36 | — | 26 | — |

Table IV compares results obtained with G.20, a typical zirconia glass and E-glass, a borosilicate glass. Composites were stored under water at 18°C.

containing 5% fibres of glass A of Table I and initially cured at 18°C. The heat treatment at 60°C immersed in water is given for 1 day or 2 day durations and the last

TABLE IV

| Particulars of Glass | Matrix | Glass Content % by wt. | DAYS | | | | |
|---|---|---|---|---|---|---|---|
|  |  |  | 7 | 28 | 90 | 180 | 360 |
| Modulus of Rupture | | | | | | | |
| E glass | OPC | 5.3 | 4030 | 4000 | 3445 | 3000 | 2620 |
| E glass - | OPC + 40% PFA | 5.26 | 2690 | 3260 | 3430 | 3120 | 2352 |
| G.20 glass | OPC + 40% PFA | 5.46 | 3268 | 3984 | 4266 | 4420 | 4566 |
| Impact Strength | | | | | | | |
| E glass | OPC | | — | 63 | 27 | 19 | 17 |
| E glass - | OPC + 40% PFA | | — | 73 | 76 | 32 | 13 |
| G.20 glass | OPC + 40% PFA | | — | 89 | 87 | 89.5 | 111 | column gives the figure obtained after storage at 18°C in water subsequent to the heat treatment.

TABLE V

|  | Initial Strength | 1 day | 2 day | 1 yr. storage |
|---|---|---|---|---|
| Modulus of rupture | 3420 | 4190 | — | 4470 |
| Impact strength | 115 | 102 | — | 92 |
| Modulus of rupture | 3420 | — | 4520 | 4250 |
| Impact strength | 115 | — | 105 | 95 |
| Modulus of rupture | 2100 | — | 2920 | 3270 |
| Impact strength | — | — | 67 | 56 |

The present invention leads to the production of fibre reinforced cement products of outstanding durability in air and under wet conditions. Such products can have a modulus of rupture of at least 3,500 lbs./sq.in. and impact strength of at least 50 in. lbs./sq.in. and show sustained retention of desirable properties at ambient temperatures. Accelerated tests also show good retention of properties. For example, when tested in water at 50°C for 28 days commonly at least 80% and frequently at least 90% retention of strength is achieved.

A particularly valuable embodiment of the invention is a fibre-reinforced Portland cement product containing from 35 to 45% by weight of pulverised fuel ash and reinforced with fibres of an alkali resistant glass containing at least 9 mol% $ZrO_2$ and having a modulus of rupture after initial curing which increases with time.

I claim:

1. A fibre-reinforced pozzolanic cement product in which the cement matrix contains at least 10% by weight of a pozzolana and from 0.5 to 10% by weight of fibres which are alkali-resistant glass fibres comprising a silica/zirconia glass containing at least 6.0 mol percent of zirconia.

2. A cement product according to claim 1, in which the pozzolana content of the matrix is at least 15%.

3. A cement product according to claim 1, in which the pozzolana content of the matrix is at least 25%.

4. A cement product according to claim 1, in which the pozzolana content of the matrix is from 35 to 45%.

5. A cement product according to claim 1, in which the pozzolana content of the matrix is at least 40%.

6. A cement product according to claim 1, in which the pozzolana is a natural pozzolana.

7. A cement product according to claim 1, in which the pozzolana is pulverised fuel ash.

8. A cement product according to claim 1, in which the pozzolana is a soda/lime/silica glass.

9. A cement product according to claim 1, in which the glass is one based on the system $SiO_2/ZrO_2/Na_2O$.

10. A cement product according to claim 1, in which the glass contains at least 65% $SiO_2$ and at least 10% $ZrO_2$ by weight.

11. A fibre-reinforced cement product according to claim 1 of improved water durability, said product having modulus of rupture and impact strength retentions of at least 80% when tested before and after immersion in water at 50°C. for 28 days.

12. A cement product according to claim 1 having a modulus of rupture of at least 3,500 pounds per square inch, an impact strength of at least 50 inch pounds per square inch, and which retains at least 80 percent of said properties when immersed in water at 50°C. for 28 days.

13. A fibre-reinforced Portland cement product containing from 35 to 45% by weight of pulverised fuel ash and reinforced with from 0.5 to 10% by weight of fibres which are fibres of an alkali resistant silica/zirconia glass containing at least 9 mol percent of $ZrO_2$ and having a modulus of rupture after initial curing which increases with time.

14. A process of producing a fibre-reinforced cement product in which from 0.5 to 10% by weight of alkali resistant glass fibres comprising a silica/zirconia glass containing at least 6.0 mol percent of zirconia are incorporated in a cement matrix comprising Portland cement containing at least 10% by weight of a pozzolana.

15. A process of producing a fibre-reinforced cement product in which from 0.5 to 10% by weight of alkali resistant glass fibres comprising a silica/zirconia glass containing at least 6.0 mol percent of zirconia are incorporated in a cement matrix comprising Portland cement containing at least 10% by weight of a pozzolana and in which the resulting composite is subjected to a curing treatment at elevated temperature.

16. A process according to claim 15, in which the curing treatment is conducted in water at a temperature of at least 60°C.

17. A process according to claim 16, in which the curing treatment is conducted at 60° – 80°C for at least 2 days.

* * * * *

UNITED STATES PATENT OFFICE
CERTIFICATE OF CORRECTION

PATENT NO. : 3,852,082
DATED : December 3, 1974
INVENTOR(S) : AMALENDU JYOTI MAJUMDAR It is certified that error appears in the above-identified patent and that said Letters Patent are hereby corrected as shown below:

Title page, first column, under "[30]":

insert the following foreign priority data:

July 11, 1966    Great Britain    31025/66

February 2, 1967    Great Britain    5070/67

August 4, 1967    Great Britain    35901/67

April 3, 1969    Great Britain    17448/69.

Signed and Sealed this twenty-third Day of September 1975

[SEAL]

Attest:

RUTH C. MASON
Attesting Officer

C. MARSHALL DANN
Commissioner of Patents and Trademarks